(12) United States Patent
Hsu et al.

(10) Patent No.: US 12,544,572 B2
(45) Date of Patent: Feb. 10, 2026

(54) ARTIFICIAL RETINAL PROSTHESIS

(71) Applicant: IRIDIUM MEDICAL TECHNOLOGY CO., LTD., Hsinchu (TW)

(72) Inventors: Feng-Hsiung Hsu, Hsinchu (TW); Yung-Chan Chen, Hsinchu (TW); Long-Sheng Fan, Hsinchu (TW)

(73) Assignee: IRIDIUM MEDICAL TECHNOLOGY CO., LTD., Hsinchu (TW)

( * ) Notice: Subject to any disclaimer, the term of this patent is extended or adjusted under 35 U.S.C. 154(b) by 451 days.

(21) Appl. No.: 17/704,842

(22) Filed: Mar. 25, 2022

(65) Prior Publication Data
US 2022/0212011 A1    Jul. 7, 2022

Related U.S. Application Data

(63) Continuation-in-part of application No. 16/230,218, filed on Dec. 21, 2018, now abandoned.

(60) Provisional application No. 62/610,004, filed on Dec. 22, 2017.

(51) Int. Cl.
| | | |
|---|---|---|
| *A61N 1/36* | (2006.01) | |
| *A61F 2/14* | (2006.01) | |
| *A61F 9/08* | (2006.01) | |
| *A61N 1/05* | (2006.01) | |
| *H04N 25/78* | (2023.01) | |

(52) U.S. Cl.
CPC ............ *A61N 1/36046* (2013.01); *A61F 2/14* (2013.01); *A61N 1/0543* (2013.01); *H04N 25/78* (2023.01); *A61F 9/08* (2013.01)

(58) Field of Classification Search
None
See application file for complete search history.

(56) References Cited

U.S. PATENT DOCUMENTS

| | | | |
|---|---|---|---|
| 6,804,560 B2 | 10/2004 | Nisch et al. | |
| 7,751,896 B2 | 7/2010 | Graf et al. | |
| 9,155,881 B2 | 10/2015 | Fan | |
| 2004/0136570 A1* | 7/2004 | Ullman | G06T 5/75 |
| | | | 382/114 |
| 2008/0228242 A1* | 9/2008 | Fink | A61F 9/08 |
| | | | 607/54 |
| 2010/0211168 A1 | 8/2010 | Goertz et al. | |
| 2011/0202132 A1* | 8/2011 | Meijer | A61N 1/0543 |
| | | | 623/4.1 |
| 2014/0085447 A1* | 3/2014 | Lorach | G06V 10/451 |
| | | | 348/62 |
| 2015/0049231 A1 | 2/2015 | Chen et al. | |
| 2016/0038739 A1 | 2/2016 | Liu et al. | |
| 2016/0118429 A1 | 4/2016 | Otsuji | |
| 2016/0256677 A1 | 9/2016 | Song et al. | |
| 2019/0388688 A1* | 12/2019 | Fan | A61N 1/37223 |
| 2022/0092456 A1* | 3/2022 | Piot | G06F 18/217 |

(Continued)

*Primary Examiner* — Erica S Lee
(74) *Attorney, Agent, or Firm* — MUNCY, GEISSLER, OLDS & LOWE, P.C.

(57) ABSTRACT

An artificial prosthesis is disclosed, which comprises a pixel array, a correlated double sampling unit, an analog-to-digital converter, a digital core, and a digital-to-analog converter. The digital core is configured to perform a calculation of electrical stimulation waveform of each of the pixels by using a processing function of an ANN. As such, the neural stimulation levels for artificial vision can be optimized.

6 Claims, 4 Drawing Sheets

(56) References Cited

U.S. PATENT DOCUMENTS

| | | | |
|---|---|---|---|
| 2023/0145616 A1* | 5/2023 | Chadha | G06N 3/045 382/156 |
| 2023/0377155 A1* | 11/2023 | Raharja | G06T 7/0012 |

* cited by examiner

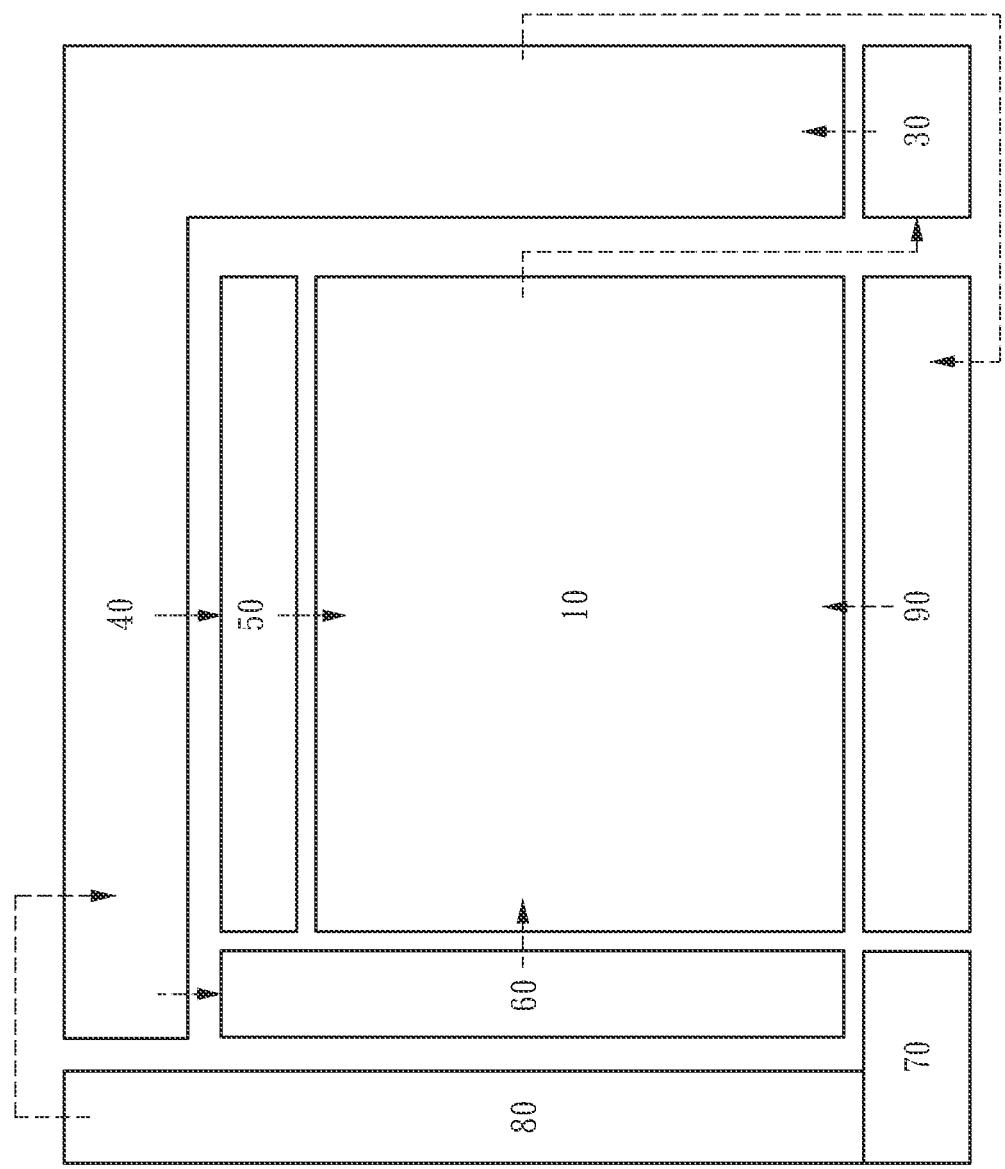

ARTIFICIAL RETINAL PROSTHESIS

CROSS-REFERENCE TO RELATED APPLICATION

The present application is a continuation-in-part application of U.S. patent application Ser. No. 16/230,218, filed on Dec. 21, 2018, which claims the benefit of U.S. Provisional Patent Application No. 62/610,004, entitled "System for Artificial Retina Prosthesis", which was filed on Dec. 22, 2017, and the disclosure of which is incorporated herein by reference in its entirety.

FIELD OF THE INVENTION

The present invention relates to an artificial retinal prosthesis, and more particularly to an artificial retinal prosthesis with a digital core to perform a calculation of electrical stimulation waveform of each pixel to optimize neural stimulation levels for artificial vision.

BACKGROUND OF THE INVENTION

Currently, among the patients with visual deterioration, some patients choose to implant an artificial retina to improve their vision. At present, expensive artificial retinas of the commercial standard with low pixels have a limited improvement on the quality of life of patients. In view of this, many companies and research institutes have begun to actively invest in the improvement of microsystem for artificial retina.

However, the conventional artificial retinal devices are mostly microelectrodes made of planar chips, which are mismatched with the non-planar shape of the retinal tissues, and may cause additional interference between the microelectrodes, and adversely affect the image resolution of the components. In this regard, the applicant's U.S. Pat. No. 9,155,881 B2 proposes a non-planar chip set having a flexible structure formed by a curved deformation of a planar shape. The flexible structure comprises at least one semiconductor material layer, around a central portion of the flexible structure, there is a plurality of slit passage openings extending from a periphery of the flexible structure toward the central portion, and the slit passages are used to reduce a displacement stress generated after the planar shape is crookedly deformed to become the flexible structure. Outside the flexible structure, a bonding structure is combined with at least one fixing structure to maintain the flexible structure in a curved state, and the element can be thin enough to be bent 90 micrometers from a center to an edge to match the shape of the retina. In this way, a neuron-to-electrode distance between the component electrodes and target nerve cells of the retina is reduced, and the electric power required for activating or stimulating each pixel of the nerve cells can be reduced to generate a higher pixel density with a supplyable power density, and can also improve the image resolution received by the nerve cells of the user that are implanted with the components.

However, the improvement on the artificial retina is not limited to this. In order to give the user a more comfortable visual experience, many R&D teams are actively making improvements on the image resolution. The current mainstream method is to increase a number of the pixel electrodes of artificial retina, but the complicated circuit and signal processing that come with it become a new problem.

For example, in an artificial retina having a plurality of pixel units, disclosed in U.S. Pat. No. 7,751,896 B2, each of the pixel units comprises at least one image unit for converting an incident light into an electrical signal, and at least one amplifier, wherein the image unit has a logarithmic characteristic that converts an incident light of a specific intensity into an electrical signal of a specific amplitude. Therefore, the incident light can be efficiently converted into a stimulation signal by a simple circuit device, and the nerve cells in the retina can be effectively stimulated even if given different ambient illuminations.

For example, in an artificial retina disclosed in U.S. Pat. No. 6,804,560 B2, at least one amplifier is provided in the artificial retina, and a plurality of stimulation electrodes is provided via the at least one amplifier based on signals received by a pixel element. The patented artificial retina further comprises at least one photosensitive reference element coupled to the amplifier, the photosensitive reference element is capable of controlling a magnification of the amplifier based on an amount of light energy irradiating thereon. In this way, electrical stimulation signals of discharge are suitable for average light intensity, just like the response of eye to ambient light conditions under natural conditions, not only avoiding the stimulation electrodes from transmitting too strong electrical signals to adjacent retinal nerve cells under relatively bright ambient light, resulting in excessive stimulation or even cell damage; on the other hand, stimulation signals with sufficient intensity can be transmitted to adjacent retinal nerve cells even under very weak ambient light conditions.

In view of a number of pixel units of the artificial retina continues to increase, investing continuously in related research on improvements of suchlike circuits and signal processing is urgently required.

SUMMARY OF THE INVENTION

The present invention provides an artificial retinal prosthesis. The artificial retinal prosthesis comprises a pixel array and a processing unit. The pixel array comprises a plurality of pixels, each of the pixels comprises a photosensor to receive image, an electrode-driving circuitry coupled to the photosensor, and an electrode driven by the electrode-driving circuitry to stimulate neuron cells. The processing unit coupled to the pixel array and stored a plurality of convolutional matrices with corresponding spatial size of each of the pixels span close to a receptive field of target neuron cells such that the target neuron cells are electrically stimulated, which are suitable to determine electrical stimulation output by each electrode to induce perception of vision. The processing unit comprises an ADC, a digital core coupled with the ADC and a DAC coupled with the digital core.

The ADC converts a image received by the photosensors in the pixel array to a binary form;

The digital core calculates and obtain the electrical stimulation waveform for each of the pixels based on the following equation:

$$\text{Stim}(i,j,t) = H_{ANN}(\text{Img}(i,j,t))$$

Stim(i, j, t) represents the electrical stimulation waveform for the pixel at location (i, j) at time (t), Img(i, j, t) represents the image received by the photosensor of the pixel at location (i, j) at time (t), $H_{ANN}$ is a processing function of an ANN.

The DAC converts the electrical stimulation waveform from a digital format to an analog format, and outputs the electrical stimulation waveform in the digital format to the electrode-driving circuitry to drive the electrodes that stimulate the target neural cells.

By having the digital core, a large amount of data can be quickly processed and analyzed, such that calculation of the electrical stimulation waveform of each of the pixels can be performed. The calculation performed by the digital core involves calculation of a weight parameter for each of the pixels, by taking into account the image or light received by neighboring pixels and the electrical stimulation waveform at previous time. As such, the neural stimulation levels for artificial vision can be optimized.

In some implementations, the ANN includes at least one convolutional layer with a convolution matrix of corresponding to a spatial size covering the receptive field for normal retinal ganglion cell.

In some implementations, the ANN further includes at least one recurrent neural network from previous time step $X(t-1)$ combined with current inputs Input(t) (a tensor) of the recurrent neural network to generate the state tensor $X(t)$ at time (t).

In some implementations, the ANN is consisted of at least one convolutional layer with a convolution matrix of corresponding to a spatial size covering the receptive field for normal retinal ganglion cell and at least one recurrent neural network from previous time step $X(t-1)$ combined with current inputs Input(t) (a tensor) of the recurrent neural network to generate the state tensor $X(t)$ at time (t).

BRIEF DESCRIPTION OF THE DRAWINGS

FIG. 4 is a plan view of the system for artificial retinal prosthesis according to an embodiment of the present invention.

DETAILED DESCRIPTION OF THE PREFERRED EMBODIMENTS

The detailed description and technical contents of the present invention will be described as follows in conjunction with FIG. 1, FIG. 2 and FIG. 3.

Figure 1:
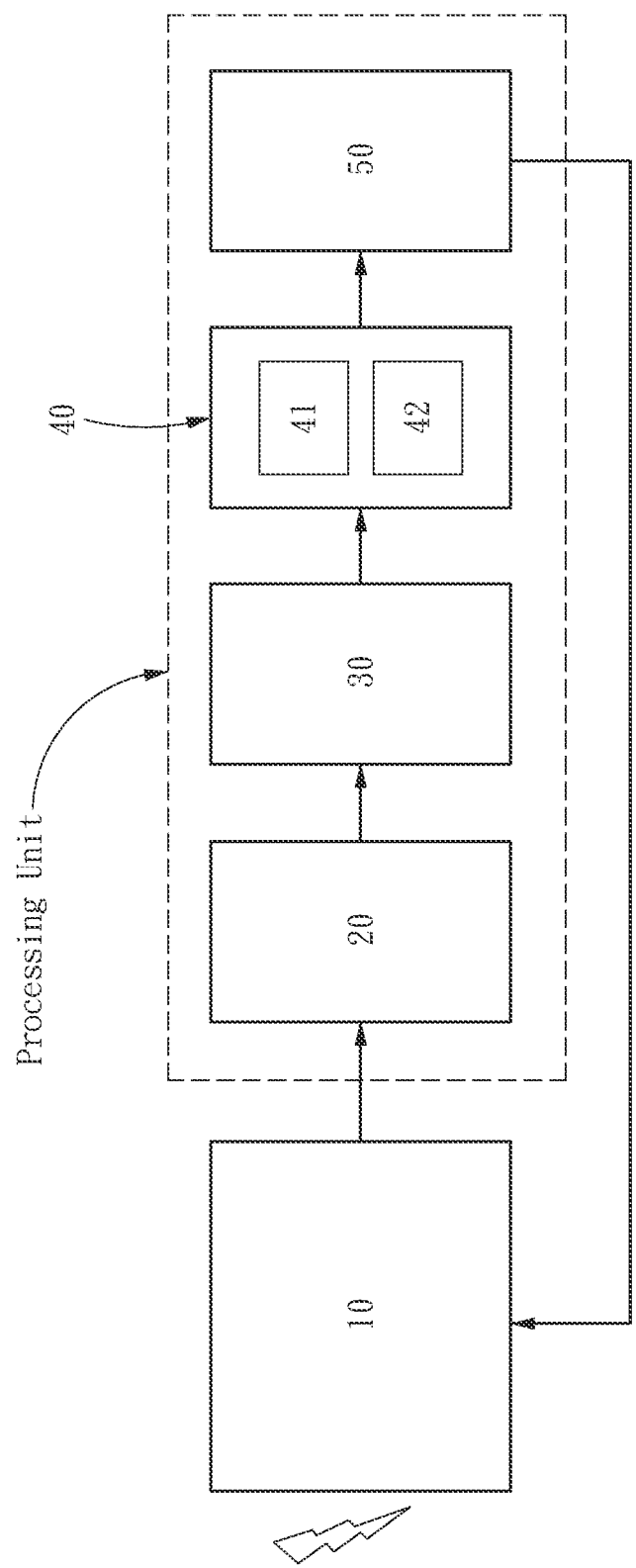
FIG. 1 is a schematic view of an architecture of a system for artificial retinal prosthesis of the present invention.

FIG. 1 is a schematic view of an architecture of a system for artificial retinal prosthesis of the present invention, which mainly comprises a pixel array 10 and a processing unit. The processing unit may comprise a correlated double sampling (CDS) unit 20, an analog-to-digital converter (ADC) 30, a digital core 40, and a digital-to-analog converter (DAC) 50. In this embodiment, the pixel array 10, the correlated double sampling unit 20, the analog-to-digital converter 30, the digital core 40, and the digital-to-analog converter 50 are integrated on a single silicon substrate to form a chip, which can be placed in a sub-retina portion or an epi-retina portion of an eye structure, and the present invention is not particularly limited thereto. According to other embodiments, the correlated double sampling (CDS) unit 20 may be replaced with other elements having the same or similar functions.

Figure 2:
FIG. 2 illustrates a pixel unit according to an exemplary embodiment of the invention.

As shown in FIG. 2, the pixel array 10 comprises a plurality of pixels 100. Each of the pixels 10 comprises a photosensor 101 to receive image, an electrode-driving circuitry 103 coupled to the photosensor 101, and an electrode 105 driven by the electrode-driving circuitry 103 to stimulate neural cells. The electrode-driving circuitry 103 is connected to the digital-to-analog converter 50 to drive the electrode 105 according to analog signals sent from the digital-to-analog converter 50. The number of the pixels is between 250 and 100,000, and in this embodiment is between 3,500 and 5,000, for example, about 4,000.

Returning to FIG. 1, the processing unit is coupled to the pixel array 10 and stored a plurality of convolutional matrices with corresponding spatial size over multiple pixels 100 spanning close to a receptive field of target neuron cells such that the target neuron cells are electrically stimulated. The convolutional matrices are suitable to determine electrical stimulation output by each electrode 105 to induce perception of vision.

The ADC 30 converts a image received by the photosensors 101 in the pixel array 10 to a binary form. The digital core 40 may comprises an ANN (artificial neural net) 41 and a control module 42. The digital core 40 calculates and obtain the electrical stimulation waveform for each of the pixels 10 based on the following equation:

$$\text{Stim}(i,j,t) = H_{ANN}(Img(i,j,t))$$

Stim(i, j, t) represents the electrical stimulation waveform for the pixel 100 at location (i, j) at time (t), Img(i, j, t) represents the image received by the photosensor 101 of the pixel 100 at location (i, j) at time (t), $H_{ANN}$ is a processing function of an ANN (artificial neural net).

In an embodiment, the ANN includes at least one convolutional layer with a convolution matrix of corresponding to a spatial size covering the receptive field for normal retinal ganglion cell. In another embodiment, the ANN further includes at least one recurrent neural network using the state tensor from previous time step $X(t-1)$ combined with current inputs Input(t) (a tensor) of the recurrent neural network to generate the state tensor $X(t)$ at time (t).

In this embodiment, the ANN is consisted of at least one convolutional layer with a convolution matrix of corresponding to a spatial size covering the receptive field for normal retinal ganglion cell and at least one recurrent neural network using the state tensor from previous time step $X(t-1)$ combined with current inputs Input(t) (a tensor) of the recurrent neural network to generate the state tensor $X(t)$ at time (t).

The DAC 50 converts the electrical stimulation waveform from a digital format to an analog format, and outputs the electrical stimulation waveform in the digital format to the electrode-driving circuitry 103 to drive the electrodes 105 that stimulate the target neural cells.

The above-mentioned calculation performed by the digital core 40 is to obtain a waveform for each of the pixels 100, by taking into account the image or light received by neighboring pixels and the state tensor at previous time step. As such, the neural stimulation patterns in space and time for artificial vision can be optimized.

In an embodiment of the presentment, the $H_{ANN}$ is calculated by using a CNN (convolutional neural net) connected in series with an RNN (recurrent neural net) and represented as the following equation:

$$\text{Stim}(i,j,t) = K_{RNN}[-H_{CNN}(Img(i,j,t))].$$

In an embodiment of the presentment, the $H_{ANN}$ is calculated by using an RNN connected in series with a CNN and represented as the following equation:

$$\text{Stim}(i,j,t) = H_{CNN}[K_{RNN}(Img(i,j,t))].$$

In an embodiment of the presentment, the $H_{ANN}$ is calculated by mixing an RNN with a CNN by putting the RNN in at least one convolution layer of the CNN.

Figure 3:
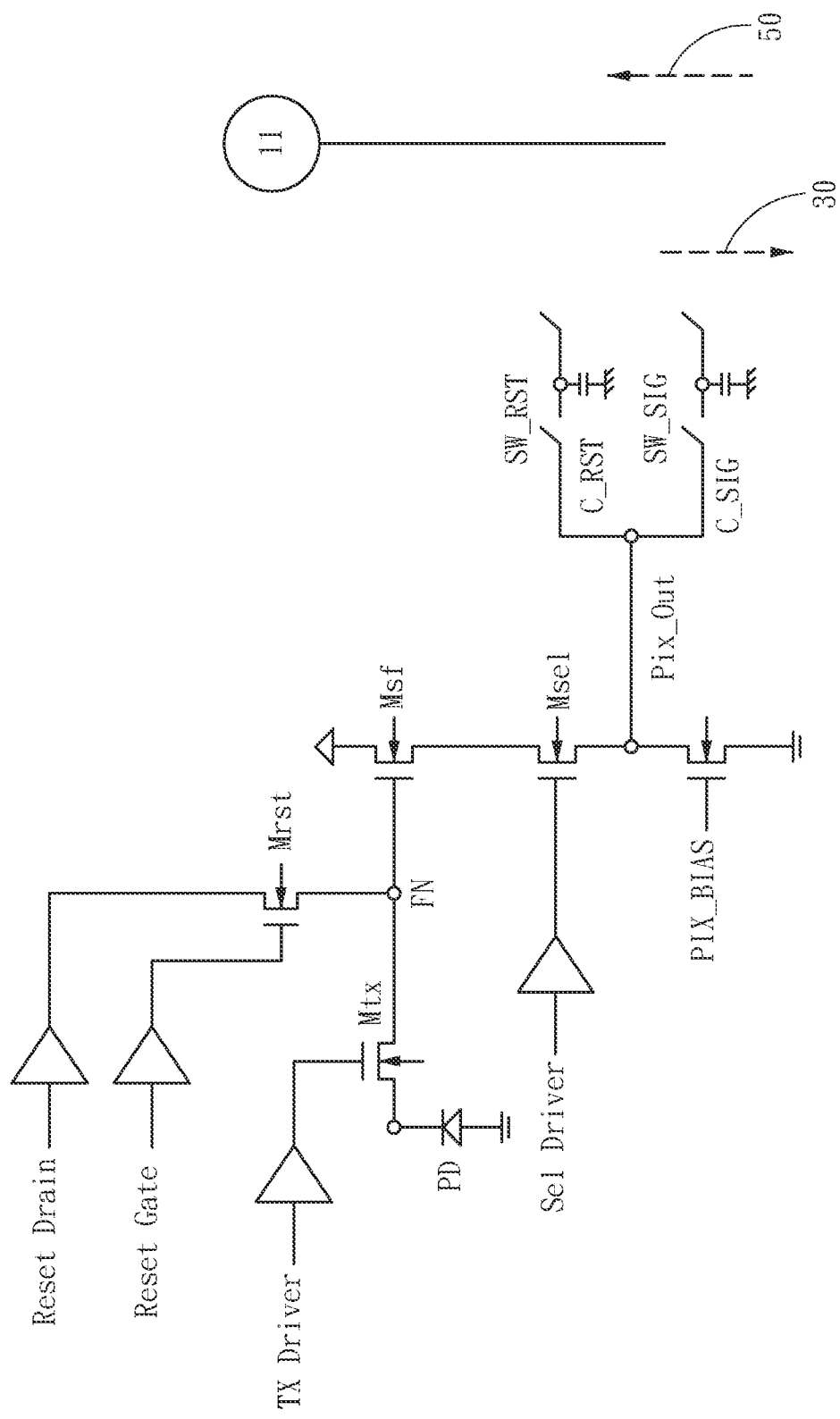
FIG. 3 is a schematic view of a circuit architecture in a pixel according to an embodiment of the present invention.

FIG. 3 shows a circuit architecture in which the pixel electrode and the correlated double sampling unit 20 are integrated in an embodiment of the present invention. In operation, the circuit architecture performs reset, exposure and read out of the pixel electrode 11, and sampling of the correlated double sampling unit 20. Detailed description is as follow.

Reset

When one of the pixels starts to operate, SW_RST and SW_SIG are both disconnected, so a signal of Pix_Out is not stored on capacitors C_RST and C_SIG. Before exposure, Reset Drain, Reset Gate and TX Driver in the circuit architecture are first turned on. At this time, a voltage of Reset Drain will be written into the photodiode through Mrst and Mtx. This step is mainly to clear electrons in the photodiode to allow the photodiode to start exposure. In addition, since current Sel Driver is in the off state, it represents Msel is also turned off, so Pix_Out does not have any signal, and since SW_RST and SW_SIG are both disconnected at this time, Pix_Out without any signal will not have any effect.

Exposure

When reset is complete, TX Driver will be turned off. At this time, the photodiode becomes a floating node, and can start to store electrons. When the exposed light (i.e. the received light) is stronger, the more electrons are stored, and the value a voltage FN is lower.

Sampling

Firstly, Mtx is turned off, Mrst is turned on, Msel is turned on, SW_RST is connected, and SW_SIG is disconnected. As a result, Pix_Out_rst (representing Pix_out when Mrst is turned on) will satisfy the following formula:

$$Pix\_Out\_rst = FN\_RST - VGS\_Msf - VDS\_Msel \quad \text{(Formula 1)}$$

Wherein, FN_RST represents the FN voltage at reset, VGS_Msf represents a gate-to-source voltage of Msf, and VDS_Msel represents a drain-to-source voltage of Msel. At this time, a voltage of Pix_Out_rst will be stored in the capacitor C_RST.

Then, Mtx is turned on, Mrst is turned off, Msel is turned on, SW_RST is disconnected, and SW_SIG is connected. As a result, Pix_Out_sig (representing Pix_out when PD receives light exposure) will satisfy the following formula:

$$Pix\_Out\_sig = FN\_SIG - VGS\_Msf - VDS\_Msel \quad \text{(Formula 2)}$$

Wherein, FN_SIG represents the information of a voltage relative to a light intensity stored in the photodiode, and Pix_Out_sig will be stored in the capacitor C_SIG.

Signals of the capacitors C_RST and C_SIG are sent to a pre-stage circuit of the analog-to-digital converter 30, and a difference between the two signals are extracted. The difference between the two signals is $$Pix\_Out\_\_rst - Pix\_Out\_sig = FN\_RST - FN\_SIG \quad \text{(Formula 3)}$$

It can be seen that the effects of VGS_Msf and VDS_Msel are removed, leaving only FN_RST and FN_SIG, thereby deducting the associated noise and reducing the mismatch. The correlated double sampling unit 20 acts as a noise reduction element for removing unwanted offsets in the signals. In this embodiment, the noise in the light-induced electrical stimulation signal is removed by the correlated double sampling unit 20.

Read Out

In this way, when the photodiode receives incident light, the photodiode convert the incident light to a plurality of light-induced electrical stimulation signal through the photodiode according to an intensity ratio of the incident light, and the light-induced electrical stimulation signal is outputted to the analog-to-digital converter 30 via the node Pix_Out.

The light-induced electrical stimulation signal processed by the correlated double sampling unit 20 is transmitted to the analog-to-digital converter 30, and is converted into a first digital signal. Then, the light-induced electrical stimulation signal is outputted. The analog-to-digital converter 30 suitable for use in the present invention is not particularly limited. For example, the analog-to-digital converter 30 may be a pipeline ADC or a column-parallel ADC.

After the first digital signal is received by the digital core 40, an analysis process is performed to define an appropriate gain and offset for the subsequent digital-to-analog converter (DAC) 50, and a second digital signal is outputted.

The digital-to-analog converter (DAC) 50 receives the second digital signal and converts it to an appropriate analog signal according to the second digital signal, and transmits the analog signal back to the pixel array 10 to stimulate the at least one retinal nerve cell.

Referring to FIG. 4, in an embodiment, the system for artificial retinal prosthesis further comprises a row decoder 60, a wireless unit 70, a power and bandgap unit 80, and a column decoder 90. In this embodiment, the correlated double sampling unit 20 is omitted. In another embodiment, the correlated double sampling unit 20 is coupled between the pixel array 10 and the analog-to-digital converter 30. Wherein the row decoder 60 may include a first decoder and a second decoder. When the row decoder 60 is employed, the row decoder 60 can respectively output a photosensitive switching signal and a stimulation switching signal to the pixel array 10 to control the pixels of each row to be turned on or off at an appropriate time for photoreception and/or stimulation. The column decoder 90 can respectively output a photosensitive switching signal and a stimulation switching signal to the pixel array 10 to control the pixels of each column to be turned on or off at an appropriate time for photoreception and/or stimulation. When the first decoder and the second decoder are employed, the former can be used to output the photosensitive switching signal, and the latter is used to output the stimulation switching signal.

The wireless unit 70 is used to receive an external wireless signal, such as a wireless alternate current signal, and the wireless alternate current signal can include a power signal and/or a command signal. For example, if the power signal and the command signal are included in the wireless alternate current signal, the wireless unit 70 converts the power signal in the wireless alternate current signal into a DC voltage, and then transmits the DC voltage to the power and bandgap unit 80. The power and bandgap unit 80 converts the DC voltage into a stable voltage to provide power required for operation of the system. And the wireless unit 70 extracts the command signal in the wireless alternate current signal and transmits the command signal to the digital core 40.

Regarding the analog-to-digital converter 30, if a pipeline analog-to-digital converter is used, the analog-to-digital converter 30 converts only a certain pixel of a row and/or a column each time the conversion is performed, and after each pixel of the row and/or the column is converted. The digital core 40 controls the row decoder 60 to select the pixel array 10 to jump to a next row, and the information of the row is transmitted to the analog-to-digital converter 30. The digital core 40 also controls the column decoder 90 to select the pixel array 10 to jump to a next column, and the information of the column is transmitted to the analog-to-digital converter 30.

The data of each pixel of the row and/or the column is then sequentially transmitted to the analog-to-digital converter 30 one by one for analog-to-digital conversion. After the image information of an entire picture is converted and stored in the digital core 40, the digital core 40 can have the image information of the entire picture, and corresponding stimulation parameters (the second digital signals) are generated after analysis, and start to stimulate the at least one retinal nerve cell row-to-row and/or column-to-column through the digital-to-analog converter 50, the row decoder 60 and the column decoder 90. The digital-to-analog converter 50 is responsible for converting a row and/or a column of the second digit signals into analog stimulation signals. The row decoder 60 and the column decoder 90 is respectively responsible for selecting which row and column of the pixel array 10 the analog stimulation signals are to be sent to.

According to another embodiment of the present invention. If a column-parallel analog-to-digital converter is used, the conversion mode of the analog-to-digital converter 30 is to perform analog-to-digital conversion for an entire row at the same time. In other words, in this architecture, signals of pixels of each row are processed in the same time.

Returning to the embodiment of FIG. 4, in operation of an embodiment, the digital core 40 first controls the row decoder 60 to output the photosensitive switching signal to the pixel array 10, each row of the pixel array 10 will be sequentially integrated of the illumination on each pixel to voltage values. According to the photoreception of each column of the pixel array 10, a corresponding pixel voltage is outputted to the analog-to-digital converter 30 for converting the corresponding pixel voltage into the first digital signal according to the incident light, and the first digital signal is transmitted to the digital core 40.

After receiving the first digital signal of a whole pixel array, the digital core 40 performs an ANN process, and then generates the second digital signal and transmits the second digital signal to the digital-to-analog converter 50, and then the digital-to-analog converter 50 generates an electrical stimulation signal related to light intensity and sends the electrical stimulation signal to the pixel electrodes 11. At the same time, the digital core 40 also controls the row decoder 60 to output the stimulation switching signal to the pixel array 10 to control the pixels of each row to be turned on or off at an appropriate time, and the electrical stimulation signal is coordinatively used to electrically stimulate the at least one retinal nerve cell.

Specifically, the row decoder 60 is used to control reset, exposure and read out of the pixel array 10, that is, to control Reset Drain, Reset Gate, TX Driver, and Sel Driver in FIG. 3 to reset or expose the pixels of a specific row. When all the pixels are exposed, images of the entire picture can be obtained. After further analysis by the digital core 40 suitable stimulating parameters are generated and sent to the digital-to-analog converter 50 and thus the magnitude of the electrical stimulation signal required for inputting into the pixels of each row to stimulate the at least one retinal nerve cell can be obtained. Secondly, since the present invention stimulates the at least one retinal nerve cell row-to-row, when the digital-to-analog converter 50 of FIG. 4 sends an electrical stimulus, only one row of electrical stimulus is generated within a same time, and at this time, the row decoder 60 must select which row in the pixel array 10 to receive the electrical stimulus.

In another embodiment, the invention provides a system for artificial retinal prosthesis. The system integrates the above-mentioned pixel array and a control circuit for controlling the pixel array to output at least one electrical stimulus to a retinal nerve cell on a single silicon substrate. In the embodiment, the control circuit includes a correlated double sampling (CDS) unit 20, an analog-to-digital converter (ADC) 30, a digital core 40, and a digital-to-analog converter (DAC) 50. Other suitable components may be further added to the control circuit as appropriate. In the embodiment, the individual operation of the components in the control circuit and the operation of the retinal implant device are similar to the embodiments described above except for being integrated in a single substrate. Thus, the detailed operation is not described herein.

What is claimed is:

1. An artificial retinal prosthesis, comprising:
a pixel array comprising a plurality of pixels, each of the pixels comprising a photosensor to receive image, an electrode-driving circuitry coupled to the photosensor, and an electrode driven by the electrode-driving circuitry configured to stimulate target neuron cells; and
a processing unit, coupled to the pixel array and stored a plurality of convolutional matrices, each of the convolutional matrices being corresponding to spatial size of each of the pixels and spanning close to a receptive field of target neuron cells such that the target neuron cells are electrically stimulated, which are configured to determine electrical stimulation output by each electrode to induce perception of vision, the processing unit comprising an analog-to-digital converter (ADC), a digital core coupled with the ADC and a digital-to-analog converter (DAC) coupled with the digital core;
wherein the ADC converts an image received by the photosensors in the pixel array to a binary form;
wherein the digital core calculates and obtains an electrical stimulation waveform for each of the pixels based on the following equation:

$$\text{Stim}(i,j,t) = H_{ANN}(\text{Img}(i,j,t))$$

wherein Stim (i, j, t) represents the electrical stimulation waveform for the pixel at location (i, j) at time (t), Img (i, j, t) represents the image received by the photosensor of the pixel at location (i, j) at time (t), $H_{ANN}$ is a processing function of an artificial neural net (ANN) involving a calculation of a weight parameter for the pixel at location (i, j) based on images received by the pixel at location (i, i) and neighboring pixels, and electrical stimulation waveforms calculated at previous times and the present time (t); and
wherein the DAC converts the electrical stimulation waveform from a digital format to an analog format, and outputs the electrical stimulation waveform in the analog format to the electrode-driving circuitry to drive electrode that stimulates the target neuron cells.

2. An artificial retinal prosthesis, comprising:
a pixel array comprising a plurality of pixels, each of the pixels comprising a photosensor to receive image, an electrode-driving circuitry coupled to the photosensor, and an electrode driven by the electrode-driving circuitry configured to stimulate target neuron cells; and
a processing unit, coupled to the pixel array and stored a plurality of convolutional matrices, each of the convolutional matrices being corresponding to spatial size of each of the pixels and spanning close to a receptive field of target neuron cells such that the target neuron cells are electrically stimulated, which are configured to determine electrical stimulation output by each electrode to induce perception of vision, the processing unit comprising an analog-to-digital converter (ADC), a digital core coupled with the ADC and a digital-to-analog converter (DAC) coupled with the digital core;

wherein the ADC converts an image received by the photosensors in the pixel array to a binary form;

wherein the digital core calculates and obtains an electrical stimulation waveform for each of the pixels based on the following equation:

$$Stim(i,j,t) = H_{ANN}(Img(i,j,t))$$

wherein Stim (i, j, t) represents the electrical stimulation waveform for the pixel at location (i, j) at time (t), Img (i, j, t) represents the image received by the photosensor of the pixel at location (i, j) at time (t), $H_{ANN}$ is a processing function of an artificial neural net (ANN) involving a calculation of a weight parameter based on at least one convolutional layer with a convolution matrix of corresponding to a spatial size covering the receptive field for normal retinal ganglion cell and electrical stimulation waveforms calculated at previous times and the present time (t); and wherein the DAC converts the electrical stimulation waveform from a digital format to an analog format, and outputs the electrical stimulation waveform in the analog format to the electrode-driving circuitry to drive electrode that stimulates the target neuron cells.

3. An artificial retinal prosthesis, comprising:
a pixel array comprising a plurality of pixels, each of the pixels comprising a photosensor to receive image, an electrode-driving circuitry coupled to the photosensor, and an electrode driven by the electrode-driving circuitry configured to stimulate target neuron cells; and
a processing unit, coupled to the pixel array and stored a plurality of convolutional matrices, each of the convolutional matrices being corresponding to spatial size of each of the pixels and spanning close to a receptive field of target neuron cells such that the target neuron cells are electrically stimulated, which are configured to determine electrical stimulation output by each electrode to induce perception of vision, the processing unit comprising an analog-to-digital converter (ADC), a digital core coupled with the ADC and a digital-to-analog converter (DAC) coupled with the digital core;

wherein the ADC converts an image received by the photosensors in the pixel array to a binary form;

wherein the digital core calculates and obtains an electrical stimulation waveform for each of the pixels based on the following equation:

$$Stim(i,j,t) = H_{ANN}(Img(i,j,t))$$

wherein Stim (i, j, t) represents the electrical stimulation waveform for the pixel at location (i, j) at time (t), Img (i, j, t) represents the image received by the photosensor of the pixel at location (i, j) at time (t), $H_{ANN}$ is a processing function of an artificial neural net (ANN) involving a calculation of a weight parameter based on at least one convolutional layer with a convolution matrix of corresponding to a spatial size covering the receptive field for normal retinal ganglion cell and at least one recurrent neural network from previous time step X(t−1) combined with current inputs Input (t) (a tensor) of the recurrent neural network to generate the state tensor X(t) at time (t); and wherein the DAC converts the electrical stimulation waveform from a digital format to an analog format, and outputs the electrical stimulation waveform in the analog format to the electrode-driving circuitry to drive the electrode that stimulates the target neuron cells.

4. The artificial retinal prosthesis of claim 3, wherein the $H_{ANN}$ is calculated by using a convolutional neural net (CNN) connected in series with a recurrent neural net (RNN) and represented as the following equation:

$$Stim(i,j,t) = K_{RNN}[H_{CNN}(Img(i,j,t))].$$

5. The artificial retinal prosthesis of claim 3, wherein the $H_{ANN}$ is calculated by using a recurrent neural net (RNN) connected in series with a convolutional neural net (CNN) and represented as the following equation:

$$Stim(i,j,t) = H_{CNN}[K_{RNN}(Img(i,j,t))].$$

6. The artificial retinal prosthesis of claim 3, wherein the $H_{ANN}$ is calculated by mixing a recurrent neural net (RNN) with a convolutional neural net (CNN) by putting the RNN in at least one convolution layer of the CNN.

* * * * *